(12) United States Patent
Sawai

(10) Patent No.: US 7,943,893 B2
(45) Date of Patent: May 17, 2011

(54) ILLUMINATION OPTICAL SYSTEM AND IMAGE PROJECTION DEVICE HAVING A ROD INTEGRATOR UNIFORMIZING SPATIAL ENERGY DISTRIBUTION OF DIFFUSED ILLUMINATION BEAM

(75) Inventor: Yasumasa Sawai, Yamatotakada (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 599 days.

(21) Appl. No.: 12/115,791

(22) Filed: May 6, 2008

(65) Prior Publication Data
US 2008/0278693 A1    Nov. 13, 2008

(30) Foreign Application Priority Data

May 11, 2007    (JP) ................................. 2007-126562

(51) Int. Cl.
*H01L 27/00*    (2006.01)

(52) U.S. Cl. ..................................... 250/208.1; 250/216
(58) Field of Classification Search ............... 250/208.1, 250/216, 205; 353/30, 31, 38; 359/204–216, 359/238, 279, 310; 349/5–8
See application file for complete search history.

(56) References Cited

U.S. PATENT DOCUMENTS

| | | | |
|---|---|---|---|
| 5,704,700 A | 1/1998 | Kappel et al. | 353/31 |
| 6,057,894 A * | 5/2000 | Kobayashi | 349/5 |

* cited by examiner

*Primary Examiner* — Que T Le
(74) *Attorney, Agent, or Firm* — Sidley Austin LLP

(57) ABSTRACT

An illumination optical system has: a light source, a diffusion member, and a rod integrator, and illuminates an image display surface of a display element. The light source emits an illumination beam having a flat cross section. The diffusion member isotropically diffuses the illumination beam. The rod integrator uniformizes spatial energy distribution of the illumination beam put into a diffused state by the diffusion member.

20 Claims, 4 Drawing Sheets

ILLUMINATION OPTICAL SYSTEM AND IMAGE PROJECTION DEVICE HAVING A ROD INTEGRATOR UNIFORMIZING SPATIAL ENERGY DISTRIBUTION OF DIFFUSED ILLUMINATION BEAM

This application is based on Japanese Patent Application No. 2007-126562 filed on May 11, 2007, the contents of which are hereby incorporated by reference.

BACKGROUND OF THE INVENTION

1. Field of the Invention

The present invention relates to an illumination optical system and an image projection device, and more specifically to an image projection device having, for example, a digital micromirror device or a liquid crystal display (LCD) as a display element and an illumination optical system for illuminating an image display surface of the display element in the image projection device.

2. Description of Related Art

A surface emitting semiconductor laser array has received attention as a light source for a projector. This semiconductor laser array often has very flat light source arrangement, for example, 1 or 2 rows by 10 numeric sequences. Thus, when illumination is achieved with such a laser array light source, NA (numerical aperture) of illumination light greatly varies depending on directions. On the other hand, an optical system of, for example, a projection lens used in a projector has isotropic NA.

With illumination light with flat NA as described above, adjusting the optical system to smaller NA results in failure to transmit a larger NA component of the illumination light. On the other hand, adjusting the optical system to larger NA leads to upsizing of the optical system, which results in poor total efficiency. Moreover, adjusting the optical system to the larger NA of the illumination light with appropriate NA (for example, NA=0.2) greatly reduces the smaller NA (for example, NA=0.025) of the illumination light, resulting in failure to provide resolution for the smaller NA of a projected image. As described above, the use of a laser array light source presents a problem of flat NA distribution.

Patent Document 1 listed below provides an example of an illumination optical system using a laser array light source.

Patent Document 1: U.S. Pat. No. 5,704,700

In the illumination optical system described in Patent Document 1, a pair of lens arrays are used which permit homogeneous illumination having rectangular distribution with a beam, from the laser array light source, having Gaussian distribution. When the laser array light source radiates a flat beam, with a method of illumination by use of the pair of lens arrays, the lens arrays are arranged in a flat region in accordance with flat beam distribution. The flat region occupied by the lens arrays at this point has NA distribution of this illumination optical system. Therefore, the NA distribution does not become isotropic, although this is not at all described. Moreover, with the lens array method, superposition of rectangular illumination light and edge focusing performance in an illuminated region are insufficient, which requires a sufficient illumination margin region to be ensured. As a result, loss of an amount of light occur. Moreover, a too broad illumination margin region causes ghost occurring outside the screen, which is not preferable in a projector for a home theater in particular.

SUMMARY OF THE INVENTION

In view of such a circumstance, the present invention has been made, and it is an object of the invention to provide an illumination optical system which includes a light source emitting an illumination beam having a flat cross section and also which provides an illumination beam having isotropic NA distribution while having compact configuration, and also to provide an image projection device using such an illumination optical system.

According to one aspect of the invention, an illumination optical system for illuminating an image display surface of a display element includes: a light source emitting an illumination beam having a flat cross section; a diffusion member isotropically diffusing the illumination beam; and a rod integrator uniformizing spatial energy distribution of the illumination beam put into a diffused state by the diffusion member.

According to another aspect of the invention, an image projection device includes: an illumination optical system including: a light source emitting an illumination beam having a flat cross section, a diffusion member isotropically diffusing the illumination beam, and a rod integrator uniformizing spatial energy distribution of the illumination beam put into a diffused state by the diffusion member; a display element forming an image by modulating illumination light from the rod integrator; and a projection optical system projecting on an enlarged scale the image formed by the display element.

DETAILED DESCRIPTION OF PREFERRED EMBODIMENTS

Figure 1:
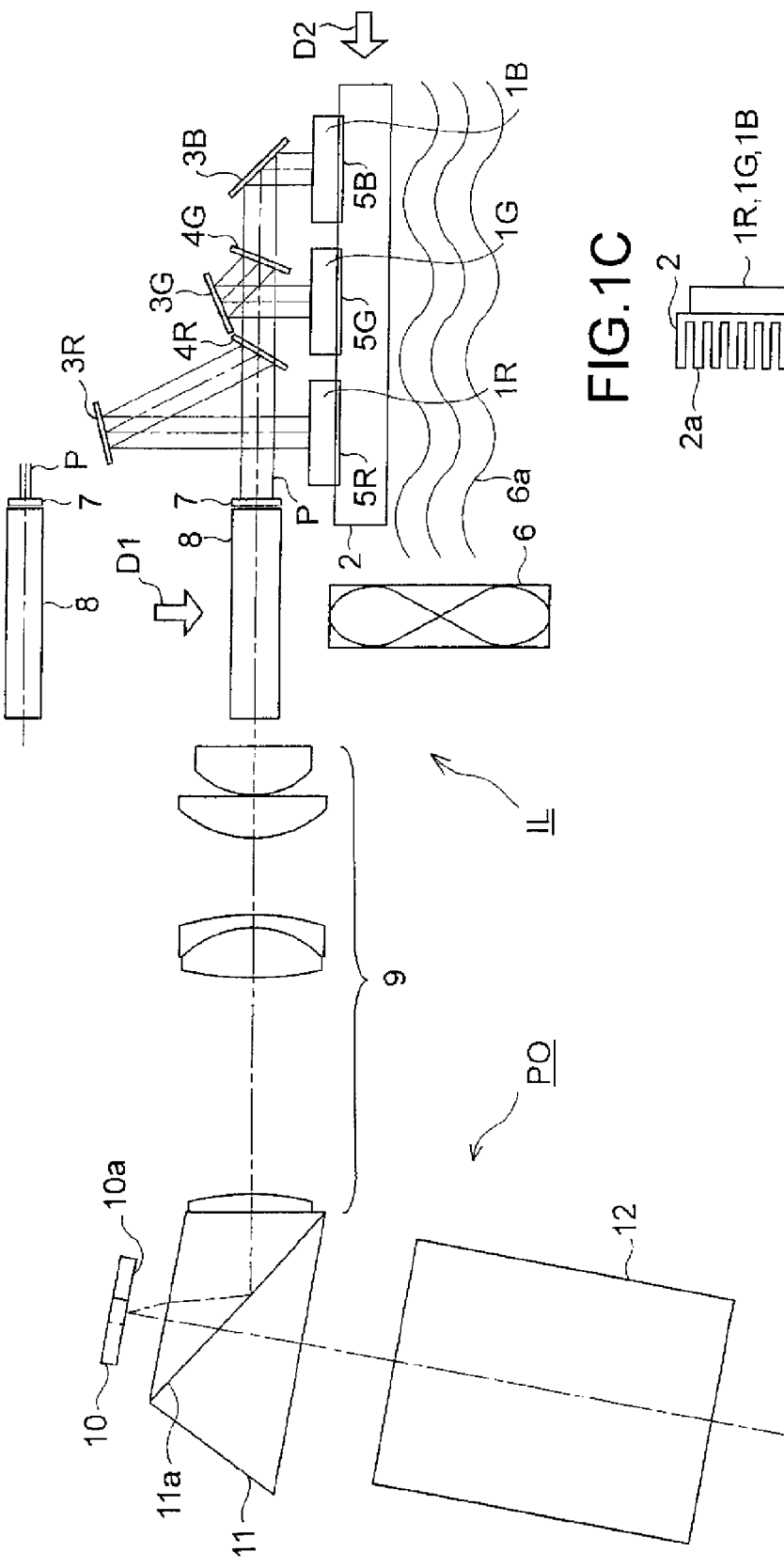
FIGS. 1A, 1B, and 1C are schematic construction diagrams showing one embodiment of an image projection device according to the present invention.

Hereinafter, the embodiments, etc. of an illumination optical system according to the present invention and an image projection device using such an illumination optical system will be described with reference to the accompanying drawings. Moreover, in the embodiments described below, as a light source that emits illumination light having a flat beam cross section, a laser array light source is exemplified, although the light source is not limited thereto. For example, an LED (light emitting diode) array or the like is applicable as a light source as long as it emits an illumination bean having a flat cross section.

FIG. 1A shows main optical arrangement of the image projection device including an illumination optical system IL, as viewed from the top. This image projection device includes: a display element 10; the illumination optical system IL for illuminating an image display surface 10a of the display element 10; and a projection optical system PO for projecting an image displayed on the image display surface 10a onto a screen (not shown) on an enlarged scale. The illumination optical system IL is composed of: laser array light sources 1R, 1G, and 1B; reflecting mirrors 3R, 3G, and 3B; dichroic mirrors 4R and 4G; a lens array 7; a rod integrator 8; a relay optical system 9; etc. Optical configuration after the rod integrator 8, that is, the relay optical system 9, the display element 10, a total internal reflection (TIR) prism 11; and a projection lens 12 have the same structure as those of a typical image projection device using a discharge lamp.

The laser array light source 1R emits an illumination beam P of a red color (R), the laser array light source 1G emits an illumination beam P of a green color (G), and the laser array light source 1B emits an illumination beam P of a blue color (B). That is, the three laser array light sources 1R, 1G, and 1B emitting illumination beams P of the three primary colors R, G, and B, respectively, flash sequentially, and the display element 10 displays on the image display surface 10a images in accordance with the respective colors of the illumination beams P, whereby a color image is displayed.

Each of the laser array light sources 1R, 1G, and 1B has flat light source arrangement (for example, 1 or 2 rows by 10 sequences). Thus, the illumination beam P emitted from each of the laser array light sources 1R, 1G, and 1B has a flat cross section. Then, the three laser array light sources 1R, 1G, and 1B are arranged so that long directions of the cross sections of the illumination light form a substantially straight line, and to the three laser array light sources 1R, 1G, and 1B, a heat sink 2 to be shared is fitted. FIG. 1C shows the heat sink 2 fitted to the laser array light sources 1R, 1G, and 1B as viewed from the side (that is, a direction of arrow D2 in FIG. 1A).

As shown in FIG. 1A, a cooling fan 6 is arranged on the side surface side of the heat sink 2. Wind 6a is fed from the cooling fan 6 to the heat sink 2, thereby cooling the laser array light sources 1R, 1G, and 1B. As can be seen from FIG. 1C, the heat sink 2 is formed with a plurality of fins 2a. The wind 6a from the cooling fan 6 is guided by the fins 2a so that it is fed along the direction in which the three laser array light sources 1R, 1G, and 1B are arranged. This cooling structure can be adopted by arranging the laser array light sources 1R, 1G, and 1B in a straight line. That is, through the straight layout of the laser array light sources 1R, 1G, and 1B, the shared cooling mechanism can be used, which requires only one place for cooling, thereby permitting very efficient cooling. Especially when a light source such as a semiconductor laser, a light emitting diode (LED), or the like is handled, its cooling also affect the amount of emission, and thus the aforementioned layout in the illumination optical system is very important.

Moreover, as shown in FIG. 1A, terminals 5R, 5G, and 5B for driving the laser array light sources 1R, 1G, and 1B, respectively are arranged on the same plane and in the same direction so as to be easily connected to a control board (not shown). When a light source such as a semiconductor laser, an LED, or the like is handled, a large current is fed; thus, also from viewpoints of efficiency, safety, etc., it is important to arrange the laser array light sources 1R, 1G, and 1B in the layout described above.

The illumination beam P of R emitted from the laser array light source 1R is reflected by the reflecting mirror 3R and then reflected by the dichroic mirror 4R. The dichroic mirror 4R reflects the illumination beam P of R and transmits the illumination beams P of G and B; therefore, the illumination beam P of R is reflected by the dichroic mirror 4R, so that its optical path is merged to travel along the same optical axis as that of the illumination beams P of G and B. The illumination beam P of R after the merging enters the lens array 7, and is split and diffused. The illumination beam P of G emitted from the laser array light source 1G is reflected by the reflecting mirror 3G and then reflected by the dichroic mirror 4G. The dichroic mirror 4G reflects the illumination beam P of G and transmits the illumination beam P of B; therefore, the illumination beam P of G is reflected by the dichroic mirror 4G, so that its optical path is merged to travel along the same optical axis as that of the illumination beam P of B. The illumination beam P of G after the merging is transmitted through the dichroic mirror 4R, enters the lens array 7, and is split and diffused. The illumination beam P of B emitted from the laser array light source 1B is reflected by the reflecting mirror 3B and then sequentially transmitted through the dichroic mirrors 4G and 4R, so that its optical path is merged to travel along the same optical axis as that of the illumination beams P of R and G. The illumination beam P of B after the merging enters the lens array 7, and is split and diffused.

As described above, the illumination beams P of R, G, and B are merged into an identical optical path by the three reflecting mirrors 3R, 3G, and 3B and the two dichroic mirrors 4R and 4G. Through this optical path merging (that is, color synthesis), the illumination beams P of R, G, and B become coaxial with each other and also have the same optical path length from an emission surface to the rod integrator 8. As a result, their beam cross sections on the same plane after the merging become substantially equal to each other, details of which will be described later on.

The illumination beams P of R, G, and B after the merging are split and diffused by the lens array 7 composed of a plurality of lens cells 7a (see FIGS. 3A and 3B to be described later), and then enters the rod integrator 8. As described above, the illumination beams P emitted from the respective laser array light sources 1R, 1G, and 1B have a flat cross section. For the illumination beams P, in FIG. 1A showing the main optical arrangement as viewed from the top, the lens array 7 and the rod integrator 8 are shown as viewed from the side on which the beam width is larger. In FIG. 1B, the lens array 7 and the rod integrator 8 are shown as viewed from a side on which the beam width is smaller (i.e., a direction of arrow D1 in FIG. 1A).

Each of the illumination beams P of R, G, and B put into a diffused state by the lens array 7 passes through the rod integrator 8 whereby its intensity is uniformized. The rod integrator 8 assumed here is hollow-rod type light intensity uniformizing means composed of four flat mirrors attached together. An illumination beam P entering from the incidence end surface is repeatedly reflected by the side surface (that is, inner wall surface) of the rod integrator 8 and thereby mixed, and then exits from the exit end surface after spatial energy distribution of the illumination beam P is uniformized. The shape of the exit end surface of the rod integrator 8 is rectangular, i.e., substantially similar to that of the image display surface 10a of the display element 10, and the exit end surface of the rod integrator 8 conjugates with the image display surface 10a of the display element 10. Therefore, through the uniformization of brightness distribution on the exit end surface due to the mixing effect described above, the display element 10 is illuminated efficiently and uniformly.

The rod integrator 8 is not limited to a hollow rod but may be a glass rod formed of a glass body in the shape of a quadrangular prism. Moreover, the number of its side surfaces is not limited to four as long as its shape fits the shape of the image display surface 10a of the display element 10. That is, the shape of its cross section is not limited to a quadrilateral such as a rectangle. Therefore, examples of the rod integrator 8 used include: a hollow cylindrical body composed of a plurality of reflecting mirrors combined together; a glass body formed in the shape of a polygonal column; etc.

With a lens-array-type integrator using a pair of lens arrays, due to insufficient superposition of rectangular illumination light, insufficient edge focusing performance in an illuminated region, etc, a sufficient illumination margin region needs to be ensured. This too broad illumination margin region causes loss of an amount of light and further causes ghost occurring outside the screen, which is not preferable in a projector for a home theater in particular. Therefore, as an illumination optical system for a projector, a rod type integrator is suitable.

In this illumination optical system IL, the illumination beam P is angled by the lens array 7, thereby making it easier to reflect the illumination beam P inside the rod integrator 8. In this manner, providing the configuration such that illumination light from the laser array light sources 1R, 1G, and 1B is condensed or diverged by each lens cell of the lens array 7 causes the illumination light to enter the rod integrator 8 at a larger angle with respect thereto (that is, at a large angle of incidence with respect to the incidence end surface), thus increasing the number of times of reflection inside the rod integrator 8, which makes it easier to provide uniform luminance distribution.

Figure 2:
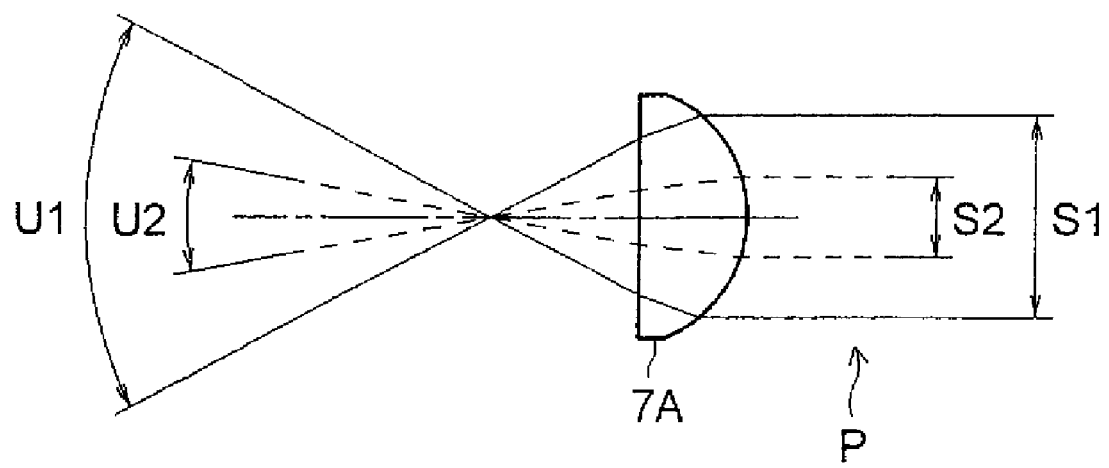
FIG. 2 is an optical path diagram illustrating a difference in an angle of refraction arising from a difference in a beam width when one convex lens is used immediately before a rod integrator.

As shown in FIG. 2, when an illumination beam P having a flat-shaped cross section is condensed by one convex lens 7A, a difference arises between angles of refraction U1 and U2 of the illumination beam P due to a difference between beam widths S1 and S2. That is, as compared to the larger beam width S1, the smaller beam width S2 does not provide a large angle with respect to the rod integrator 8. Thus, inside the rod integrator 8, the number of times of reflection in this direction decreases, thus making it difficult to provide not only isotropic NA distribution but also uniform luminance distribution.

Figure 3A:
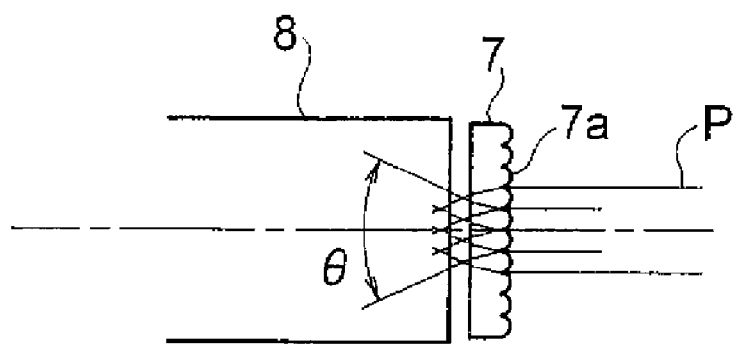
FIGS. 3A and 3B are optical path diagrams showing on an enlarged scale main parts of a lens array and the rod integrator in FIGS. 1A and 1B as viewed from directions in which beam widths are different.
Figure 3B:
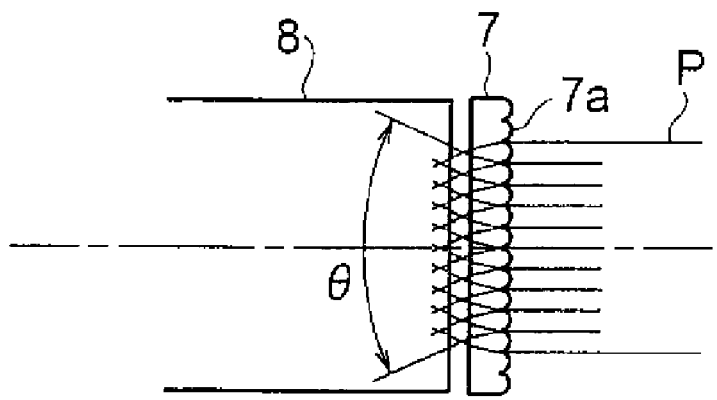

In the illumination optical system IL shown in FIG. 1, to solve the problem described above, the illumination beam P is isotropically diffused by use of the lens array 7. FIG. 3A and FIG. 3B shows main parts of the lens array 7 and the rod integrator 8 as viewed from a side on which the beam width is smaller and from a side on which the beam width is larger, respectively. That is, FIG. 3A shows on an enlarged scale the main parts of FIG. 1B, and FIG. 3B shows on an enlarged scale the main parts of FIG. 1A. The lens array 7 is formed with a plurality of lens cells 7a, each formed of a square convex lens, having the same shape (that is, surfaces with the same curvature) and the same size. Each lens cell 7a, as shown in FIG. 3A, is formed in a size sufficiently smaller than the smaller beam width.

The lens array 7 isotropically diffuse the illumination beam P by splitting the illumination beam P into a plurality of beams and isotropically changing their respective beam states. That is, the illumination beam P that has entered the lens array 7 is split into a plurality of beams as shown in FIGS. 3A and 3B, the one with a larger beam width and the one with a smaller beam width are refracted at a large angle θ in the same manner. When the cross section of the illumination beam P is flat, its beam width varies depending on directions. However, splitting the illumination beam P into a plurality of beams and isotropically changing respective states thereof prevents the influence of a beam width difference from being exerted on NA distribution. Therefore, isotropic NA distribution can be provided, thus making it possible to achieve, with simple configuration, homogeneous illumination with an illumination beam P having isotropic NA distribution. Moreover, each of the lens cells 7a forming the lens array 7 is smaller than the smallest width of the cross section of the illumination beam P entering the lens array 7, thus permitting effective diffusion also for a direction in which the beam width is smaller.

Since the lens array 7 isotropically diffuses the illumination beam P by splitting the illumination beam P into a plurality of beams and putting them into the same (or substantially the same) isotropically condensed state (or diverged state when the lens cell 7a is formed with a concave lens), the same (or substantially the same) distribution of angles of the illumination beam P entering the rod integrator 8 (that is, degree of condensation or divergence) can be provided in all the directions regardless of the beam width difference, and also the illumination optical system can be simply configured. Moreover, the use of the lens array 7 as a diffusion member permits incident beams to be isotropically diffused by the individual lens cells 7a with the same angle distribution, which simplifies the configuration and assembly of the illumination optical system and facilitates cost reduction.

As described above, since flat NA distribution is converted into isotropic NA distribution by the isotropic diffusion by the lens array 7, an illumination beam P having isotropic NA distribution can be provided even when the laser array light sources 1R, 1G, and 1B for emitting an illumination beam P having a flat cross section and also compact configuration are provided, and thus uniform luminance distribution can be provided while holding high illumination efficiency and high resolution of the projected image. Since the illumination beam P is isotropically diffused by the lens array 7, the illumination beam P enters the rod integrator 8 at a larger angle with respect thereto. As a result, the number of times of reflection inside the rod integrator 8 increases, thus making it easier to provide uniform luminance distribution. Therefore, a combination of the lens array 7 and the rod integrator 8 uniformizes the NA distribution and brightness distribution on the exit end surface of the rod integrator 8, so that homogeneous illumination can be achieved with the illumination beam P having isotropic NA distribution.

A lens of each of the lens cells 7a forming the lens array 7 is square-shaped, although a lens array 7 may be used which is formed of lens cells 7a of a different regular-polygonal shape (for example, regular-hexagonal shape). When the lens array 7 formed of the lens cells 7a of a regular-polygonal shape is used, the same refraction is performed both in the direction in which the beam width is larger and in the direction in which the beam width is smaller, which permits providing more isotropic NA distribution.

In this illumination optical system IL, the lens array 7 formed with a plurality of lens cells 7a each formed of a convex lens is used as a diffusion member. However, a lens array formed with a plurality of lens cells each formed of a concave lens may be used as a diffusion member. Moreover, the diffusion member is not limited to a lens array as long as it is an optical member having controlled, isotropic diffusion performance. Examples of this member include: an optical member having a plurality of circular conic cells placed in an array; an optical member having a plurality of pyramidal cells placed in an array; a prism array having a plurality of prism surfaces placed in an array; an optical member that randomly scatters incident light; etc. Moreover, action of diffusion exerted by the diffusion member is not limited to action of refraction (lens action, prism action, or the like). For example, the diffusion member may be formed of a diffraction grating, and may isotropically diffuse an illumination beam by its action of diffraction.

Providing this illumination optical system IL in an image projection device (rear projector, front projector, or the like) can resolve a problem attributable to flat NA distribution specific to a laser array light source, which greatly contributes to compactification, cost reduction, brightness enhancement, performance enhancement, function enhancement, etc. A device to which this illumination optical system IL is applied is not limited to an image projection device. The illumination optical system IL can be applied to any device as long as the device requires illumination light having isotropic NA distribution.

Figure 4:
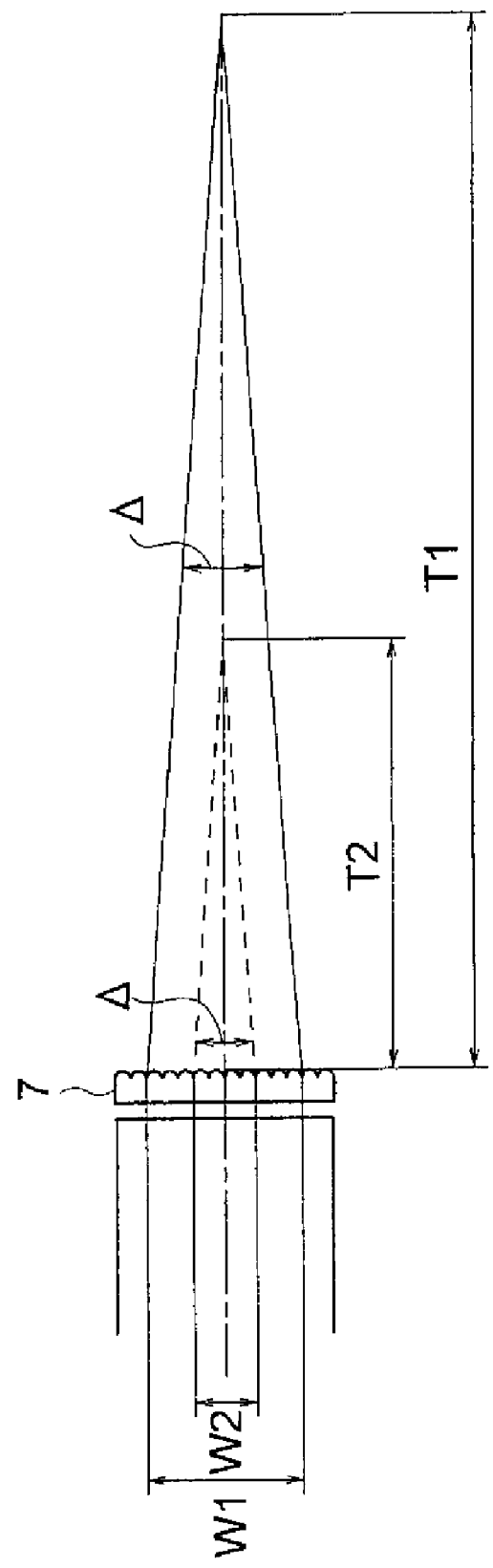
FIG. 4 is an optical path diagram illustrating a difference in a degree of beam splitting arising from differences in an optical path length and a beam width when a lens array is used immediately before the rod integrator.

For beams emitted from a directional light source, such as a laser light source, close to a point light source at the same micro angle of divergence Δ as shown in FIG. 4, a difference between optical path lengths T1 and T2 thereof directly results in a difference between beam widths W1 and W2 on an optical component (the lens array 7 here). Thus, the difference between the optical path lengths T1 and T2 from the laser array light sources 1R, 1G, and 1B of R, G, and B results in a relatively larger difference, i.e., ratio between the beam widths W1 and W2 on the lens array 7, thereby causing a large difference in the degree of beam splitting on the lens array 7 between the different colors. Thus, a difference in the luminance distribution arises between the different colors, thus causing color unevenness. In the illumination optical system IL shown in FIG. 1A, optical arrangement is achieved so that the three illumination beams P of R, G, and B whose optical paths have been merged enter the rod integrator 8 with the same angle distribution, which eliminates the risk of occurrence of color unevenness as described above. Then, the prevention of the occurrence of color unevenness permits more reliably achieving illumination with uniform luminance distribution that is substantially equal among the light of the different colors. Moreover, adopting optical arrangement such that optical path lengths from the laser array light sources 1R, 1G, and 1B to the rod integrator 8 are equal (or substantially equal) permits the prevention of the occurrence of color unevenness with simpler configuration.

As shown in FIG. 1A, illumination light exiting from the rod integrator 8 enters the TIR prism 11 through the relay optical system 9. The illumination light entering the TIR prism 11 is totally reflected by an air gap surface 11a of the TIR prism 11 and then uniformly irradiates the image display surface 10a of the display element 10. At this point, the relay optical system 9 relays the illumination light from the exit end surface of the rod integrator 8 to the image display surface 10a of the display element 10, focusing it thereon. That is, on the image display surface 10a of the display element 10, an image on the exit end surface of the rod integrator 8 is formed. If the display element is transmissive, without using the relay optical system 9, the display element may be arranged near the exit end surface of the rod integrator 8.

On the image display surface 10a of the display element 10, a two-dimensional image is formed by modulation of the illumination light. Here, a digital micromirror device is assumed as the display element 10. However, the display element 10 used is not limited thereto, and thus another non-luminous, reflective (or transmissive) display element (for example, liquid crystal display element) suitable for the projection optical system PO may be used. When the digital micromirror device is used as the display element 10, light entering it is reflected by each micro mirror in an ON/OFF state (for example, at an inclination of ±12°) and thereby spatially modulated. At this point, only the light reflected by a micromirror in an ON state is transmitted through the air gap surface 11a of the TIR prism 11 without being totally reflected, enters the projection lens 12, and then is projected onto the screen. On the other hand, the light reflected by a micromirror in an OFF state is greatly deflected toward the side opposite to the side to which the illumination light travels in the TIR prism 11, and thus does not enter the projection lens 12. In this manner, by a power of the projection lens 12 forming the projection optical system PO, a display image on the image display surface 10a is projected onto the screen on an enlarged scale.

As can be understood from the above, the embodiments described above include the following configuration (A1) to (A10) of an illumination optical system and an image projection device.

(A1) An illumination optical system for illuminating an image display surface of a display element includes: a light source emitting an illumination beam having a flat cross section; a diffusion member isotropically diffusing the illumination beam; a rod integrator uniformizing spatial energy distribution of the illumination beam put into a diffused state by the diffusion member.

(A2) The illumination optical system described in the above (A1), wherein the diffusion member isotropically diffuses the illumination beam by splitting the illumination beam into a plurality of beams and then isotropically changing respective states thereof.

(A3) The illumination optical system described in the above (A1) or (A2), wherein the diffusion member isotropically diffuses the illumination beam by splitting the illumination beam into a plurality of beams and then putting the beams into a same or substantially same isotropic condensed or diverged state.

(A4) The illumination optical system described in any one of the above (A1) to (A3), wherein the diffusion member is a lens array.

(A5) The illumination optical system described in the above (A4), wherein each lens cell forming the lens array is smaller than a smallest width of the cross section of the illumination beam entering the lens array.

(A6) The illumination optical system described in the above (A4) or (A5), wherein a lens of each lens cell forming the lens array is regular-polygonal-shaped.

(A7) The illumination optical system described in any one of the above (A1) to (A6), wherein the light source is a laser array light source.

(A8) The illumination optical system described in any one of the above (A1) to (A7), wherein as the light source, three light sources are provided which emit illumination beams of three primary colors R, G, and B, respectively, the illumination optical system further includes an optical path merging member which merges the illumination beams emitted from the light sources into one optical path, and the illumination optical system is optically arranged such that the three illumination beams whose optical paths have been merged by the optical path merging member enter the rod integrator in a same degree of divergence or condensation.

(A9) The illumination optical system described in the above (A8), wherein the optical paths from the light sources to the rod integrator have a same length.

(A10) An image projection device including the illumination optical system described in any one of the above (A1) to (A9).

According to the illumination optical system described in the above (A1), through the isotropic diffusion by the diffusion member, flat NA distribution is converted into isotropic NA distribution. Therefore, even when the light sources emitting an illumination beam having a flat cross section (for example, a laser array light source as in the illumination optical system described in the above (A7)) and also compact configuration are provided, an illuminating beam having isotropic NA distribution can be provided, and thus uniform luminance distribution can be provided while holding high illumination efficiency and high resolution of the projected image. Moreover, since the illumination beam is isotropically diffused by the diffusion member, the illumination beam enters the rod integrator at a larger angle with respect thereto. As a result, the number of times of reflection inside the rod integrator increases, thus making it easier to provide uniform luminance distribution. Therefore, a combination of the diffusion member and the rod integrator permits achieving homogeneous illumination with the illumination beam having isotropic NA distribution.

The isotropic diffusion by the diffusion member can be, for example, as in the illumination optical system described in the above (A2), performed by configuration such that an illumination beam is split into a plurality of beams and respective states thereof are isotropically changed. With a flat cross section of an illumination beam, its beam width varies depending on directions; however, with the configuration such that an illumination beam is split into a plurality of beams and respective states thereof are isotropically changed, a beam width difference does not have an influence on NA distribution and luminance distribution. Therefore, homogeneous illumination with the illumination beam having isotropic NA distribution can be achieved with simple configuration.

Further, as in the illumination optical system described in the above (A3), with the configuration such that the diffusion member isotropically diffuses the illumination beam by splitting the illumination beam into a plurality of beams and then putting the beams into a same or substantially same isotropic condensed or diverged state, angle distribution of the illumination beam entering the rod integrator (that is, degree of condensation or degrees of divergence) can be made the same or substantially same in all the directions regardless of a beam width difference, which simplifies configuration of the illumination optical system.

For example, as in the illumination optical system described in the above (A4), the use of a lens array as the diffusion member permits beams entering the individual lens cells to be isotropically diffused with the same angle distribution, which simplifies the configuration and assembly of the illumination optical system and facilitates cost reduction. When the lens array is used as the diffusion member, as in the illumination optical system described in the above (A5), with the configuration such that each lens cell forming the lens array is smaller than a smallest width of a cross section of the illumination beam entering the lens array, effective diffusion can be achieved even for a direction in which the beam width is smaller. Moreover, as in the illumination optical system described in the above (A6), if a lens of each lens cell forming the lens array is regular-polygonal-shaped (for example, square-shaped or regular-hexagonal-shaped), the same refraction is achieved both in the direction in which the beam width is larger and in the direction in which the beam width is smaller, which can provide more isotropic NA distribution.

According to the illumination optical system described in the above (A8), since the three light sources are provided which emit illumination beams of three primary colors R, G, and B, respectively, and the optical path merging member merges the illumination beams respectively emitted from the light sources into one optical path, illumination for a full color is possible. Further, since the illumination optical system is optically arranged such that the three illumination beams whose optical paths have been merged by the optical path merging member enter the rod integrator in a same degree of divergence or condensation, occurrence of color unevenness can be prevented. Therefore, illumination with uniform luminance distribution that is substantially equal among the light of the different colors can be more reliably achieved.

Further, as in the illumination optical system described in the above (A9), adopting optical arrangement such that the optical paths from the light sources to the rod integrator have a same length permits prevention of the occurrence of color unevenness with simple configuration. For example, by use of a light source device, such as a laser light source, close to a point light source that emits light at the same micro angle of divergence, a difference between the optical path lengths directly results in a difference between beam widths on an optical component. Thus, with the difference between the optical path lengths from the laser array light sources for R, G, and B to the rod integrator, the difference between the beam widths becomes a difference between angles of divergence, thus causing color unevenness due to an NA difference between the colors. Adopting the optical arrangement such that the optical paths from the laser array light sources for R, G, and B to the rod integrator have a same length can eliminate the risk of occurrence of such color unevenness.

Use of the illumination optical system with the aforementioned characteristics in an image projection device (rear projector, front projector, or the like) as described in the above (A10), for example, can resolve a problem attributable to flat NA distribution specific to a laser array light source, which greatly contributes to compactification, cost reduction, brightness enhancement, performance enhancement, function enhancement, etc. A device to which this illumination optical system described in the above (A1) to (A9) is applied is not limited to an image projection device. The illumination optical system can be applied to any device as long as the device requires illumination light having isotropic NA distribution.

What is claimed is:

1. An illumination optical system for illuminating an image display surface of a display element, the illumination optical system comprising:
   a light source emitting an illumination beam having a flat cross section;
   a diffusion member isotropically diffusing the illumination beam; and
   a rod integrator uniformizing spatial energy distribution of the illumination beam put into a diffused state by the diffusion member.

2. The illumination optical system according to claim 1, wherein the diffusion member isotropicaly diffuses the illumination beam by splitting the illumination beam into a plurality of beams and isotropically changing respective states thereof.

3. The illumination optical system according to claim 1, wherein the diffusion member isotropically diffuses the illumination beam by splitting the illumination beam into a plurality of beams and putting the beams into a same or substantially same isotropic condensed or diverged state.

4. The illumination optical system according to claim 1, wherein the diffusion member is a lens array having a plurality of lens cells.

5. The illumination optical system according to claim 4, wherein each lens cell forming the lens array is smaller than a smallest width of the cross section of the illumination beam entering the lens array.

6. The illumination optical system according to claim 4, wherein each lens cell forming the lens array is regular-polygonal-shaped.

7. The illumination optical system according to claim 6, wherein each lens cell forming the lens array is regular-hexagonal-shaped or square-shaped.

8. The illumination optical system according to claim 1, wherein the light source is a laser array light source.

9. The illumination optical system according to claim 1, wherein as the light source, three light sources are provided which emit illumination light of three primary colors R, G, and B, respectively, wherein the illumination optical system further comprises an optical path merging member which merges illumination beams emitted from the respective light sources into one optical path, and wherein the illumination optical system is optically arranged such that the three illumination beams whose optical paths have been merged by the optical path merging member enter the rod integrator in a same degree of divergence or condensation.

10. The illumination optical system according to claim 9, wherein the optical paths from the light sources to the rod integrator have a same length.

11. The illumination optical system according to claim 1, wherein the light source has: a laser array light source emitting red light, a laser array light source emitting green light, and a laser array light source emitting blue light, and wherein the three laser array light sources are arranged so that cross sections, in long directions, of beams emitted from the respective laser array light sources form a substantially straight line.

12. The illumination optical system according to claim 1, wherein the illumination optical system further comprises a relay optical system forming an image of an exit end surface of the rod integrator on the image display surface.

13. An image projection device comprising:
an illumination optical system including:
   a light source emitting an illumination beam having a flat cross section,
   a diffusion member isotropically diffusing the illumination beam, and
   a rod integrator uniformizing spatial energy distribution of the illumination beam put into a diffused state by the diffusion member;
a display element forming an image by modulating illumination light from the rod integrator; and
a projection optical system projecting on an enlarged scale the image formed by the display element.

14. The image projection device according to claim 13, wherein the diffusion member isotropically diffuses the illumination beam by splitting the illumination beam into a plurality of beams and putting the beams into a same or substantially same isotropic condensed or diverged state.

15. The image projection device according to claim 13, wherein the diffusion member is a lens array having a plurality of lens cells, each lens cell forming the lens array is smaller than a smallest width of the cross section of the illumination beam entering the lens array.

16. The image projection device according to claim 15, wherein each lens cell forming the lens array is regular-hexagonal-shaped or square-shaped.

17. The image projection device according to claim 13, wherein the light source is a laser array light source.

18. The image projection device according to claim 13, wherein as the light source, three light sources are provided which emit illumination light of three primary colors R, G, and B, respectively, wherein the illumination optical system further includes an optical path merging member which merges illumination beams emitted from the respective light sources into one optical path, and wherein the illumination optical system is optically arranged such that the three illumination beams whose optical paths have been merged by the optical path merging member enter the rod integrator in a same degree of divergence or condensation.

19. The image projection device according to claim 18, wherein the optical paths from the light sources to the rod integrator have a same length.

20. The image projection device according to claim 13, wherein the illumination optical system further includes a relay optical system forming an image of an exit end surface of the rod integrator on the image display surface.

* * * * *